United States Patent
Mitsuda et al.

(10) Patent No.: US 12,531,450 B2
(45) Date of Patent: Jan. 20, 2026

(54) ROTATING ELECTRIC MACHINE

(71) Applicant: Mitsubishi Electric Corporation, Tokyo (JP)

(72) Inventors: Hiroshi Mitsuda, Tokyo (JP); Kazumasa Ito, Tokyo (JP); Tadashi Fukami, Ishikawa (JP); Masato Koyama, Ishikawa (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 172 days.

(21) Appl. No.: 18/266,812

(22) PCT Filed: Jan. 18, 2021

(86) PCT No.: PCT/JP2021/001392
§ 371 (c)(1),
(2) Date: Jun. 13, 2023

(87) PCT Pub. No.: WO2022/153517
PCT Pub. Date: Jul. 21, 2022

(65) Prior Publication Data
US 2024/0055920 A1    Feb. 15, 2024

(51) Int. Cl.
*H02K 1/279* (2022.01)
*H02K 1/16* (2006.01)
*H02K 21/22* (2006.01)

(52) U.S. Cl.
CPC ............... *H02K 1/279* (2022.01); *H02K 1/16* (2013.01); *H02K 21/227* (2013.01)

(58) Field of Classification Search
CPC ...... H02K 21/12; H02K 21/125; H02K 21/14; H02K 21/145; H02K 21/227; H02K 1/278;
(Continued)

(56) References Cited

U.S. PATENT DOCUMENTS 3,346,793 A * 10/1967 Takahashi ............... H02K 19/12
318/704
2013/0313938 A1* 11/2013 Yamada ................. H02K 16/02
310/156.69

FOREIGN PATENT DOCUMENTS

GB          2468695 A  *  9/2010   ............. H02K 21/44
JP       2010-200482 A     9/2010
(Continued)

OTHER PUBLICATIONS

International Search Report and Written Opinion mailed on Mar. 23, 2021, received for PCT Application PCT/JP2021/001392, filed on Jan. 18, 2021, 9 pages including English Translation.
(Continued)

*Primary Examiner* — Christopher M Koehler
*Assistant Examiner* — Ahmed F Seck
(74) *Attorney, Agent, or Firm* — XSENSUS LLP

(57) ABSTRACT

A rotating electric machine according to the present disclosure is a rotating electric machine including a stator and a rotor, in which the rotor includes a plurality of permanent magnets arranged in a circumferential direction of a rotation axis and a plurality of protrusions arranged in the circumferential direction, the stator includes a plurality of teeth, an armature winding wound around the plurality of teeth, and a field winding wound around the plurality of teeth, a field pole is formed in the plurality of protrusions by energization to the field winding and the plurality of permanent magnets, the plurality of permanent magnets and the plurality of teeth are alternately arranged at intervals in the circumferential direction to form the field pole, all the permanent magnets have the same polarity, wherein, $|P_a - P_f| \neq 1$, $|P_r - P_f| \neq 1$, and $|P_a - P_r| \neq 1$, and $P_r$ is even.

10 Claims, 13 Drawing Sheets

(58) Field of Classification Search
CPC .......... H02K 1/148; H02K 1/16; H02K 1/165; H02K 1/185
See application file for complete search history.

(56) References Cited

FOREIGN PATENT DOCUMENTS

| | | | |
|---|---|---|---|
| JP | 2015-042038 A | | 3/2015 |
| JP | 2018-174645 A | | 11/2018 |
| JP | 2019103312 A | * | 6/2019 |
| WO | WO-2013073263 A1 | * | 5/2013 ............... H02K 1/02 |

OTHER PUBLICATIONS

Cai et al., "A Novel Fractional Slot Non-Overlapping Winding Hybrid Excited Machine with Consequent-Pole PM Rotor", IEEE Transactions on Energy Conversion, vol. 35, Issue: 3, Sep. 2020, pp. 1-10.

Wang et al., "A Novel Hybrid-Excited Dual-PM Machine With Bidirectional Flux Modulation", IEEE Transactions on Energy Conversion, vol. 32, No. 2, Jun. 2017, pp. 424-435.

* cited by examiner

ROTATING ELECTRIC MACHINE

CROSS-REFERENCE TO RELATED APPLICATIONS

The present application is based on PCT filing PCT/JP2021/001392, filed Jan. 18, 2021, the entire contents of which are incorporated herein by reference.

TECHNICAL FIELD

The present disclosed technology relates to a variable field motor that is a rotating electric machine and includes a DC field winding in a stator.

BACKGROUND ART

Many permanent magnet rotating electric machines are used for driving motors including EVs. In particular, in an automobile motor, a wide operating range is required. Specifically, it is necessary to strengthen the field of the magnet in order to output high torque at low rotation, and to weaken the field of the magnet in order to alleviate voltage saturation at high rotation. In response to this demand, a variable field motor has been developed that can achieve a wide operating range by appropriately adjusting the field amount according to the operating point at which the magnet and the field coil are operated in combination.

In order to make the field amount variable, it is necessary to conduct a current through a slip ring or the like in a general configuration in which a field winding is provided in a rotor. From the viewpoint of durability of a slip ring and ease of cooling of a field winding in consideration of energization, a configuration in which a stator includes a field winding has been studied (for example, Patent Literature 1).

CITATION LIST

Patent Literature

Patent Literature 1: JP 2018-174645 A

SUMMARY OF INVENTION

Technical Problem

In a variable field motor as shown in the citation list, there are three magnetomotive forces, namely, a pole due to an armature winding of a stator, a pole due to a DC field winding, and a pole due to a permanent magnet and an iron pole. When these magnetomotive forces are combined, an unbalanced magnetic attractive force may be generated. The unbalanced magnetic attractive force causes noise and axial displacement. It is conceivable to increase the air-gap length between the stator and the rotor in order to suppress the influence of the unbalanced magnetic attractive force, but it is difficult from the viewpoint of manufacturing.

The present disclosed technology has been made in view of the above problems, and an object thereof is to provide a rotating electric machine that does not generate an unbalanced magnetic attractive force in principle.

Solution to Problem

A rotating electric machine according to the present disclosure is a rotating electric machine including a stator and a rotor, in which the rotor includes a plurality of permanent magnets arranged in a circumferential direction of a rotation axis and a plurality of protrusions arranged in the circumferential direction, the stator includes a plurality of teeth, an armature winding wound around the plurality of teeth, and a field winding wound around the plurality of teeth, a field pole is formed in the plurality of protrusions by energization to the field winding and the plurality of permanent magnets, the plurality of permanent magnets and the plurality of teeth are alternately arranged at intervals in the circumferential direction to form the field pole, all the permanent magnets have the same polarity, and the number of pole pairs $P_a$ of the armature winding, the number of pole pairs $P_f$ of the field winding, and the number of poles $P_r$ of the field pole formed by the plurality of permanent magnets and the plurality of protrusions satisfy all of $|P_a-P_f|\neq 1$, $|P_r-P_f|\neq 1$, and $|P_a-P_r|\neq 1$, and $P_r$ is an even number.

Advantageous Effects of Invention

A rotating electric machine according to the present disclosed technology is a flux-modulating hybrid field motor having a field source in a stator, and has an effect of suppressing rotation axis eccentricity and vibration caused by an unbalanced magnetic attractive force.

DESCRIPTION OF EMBODIMENTS

A rotating electric machine 100 according to the present disclosed technology will be clarified by the following description with reference to the drawings. Note that the following description exemplifies embodiments of the present disclosed technology, and the present disclosed technology is not limited by this description.

First Embodiment

Figure 1:
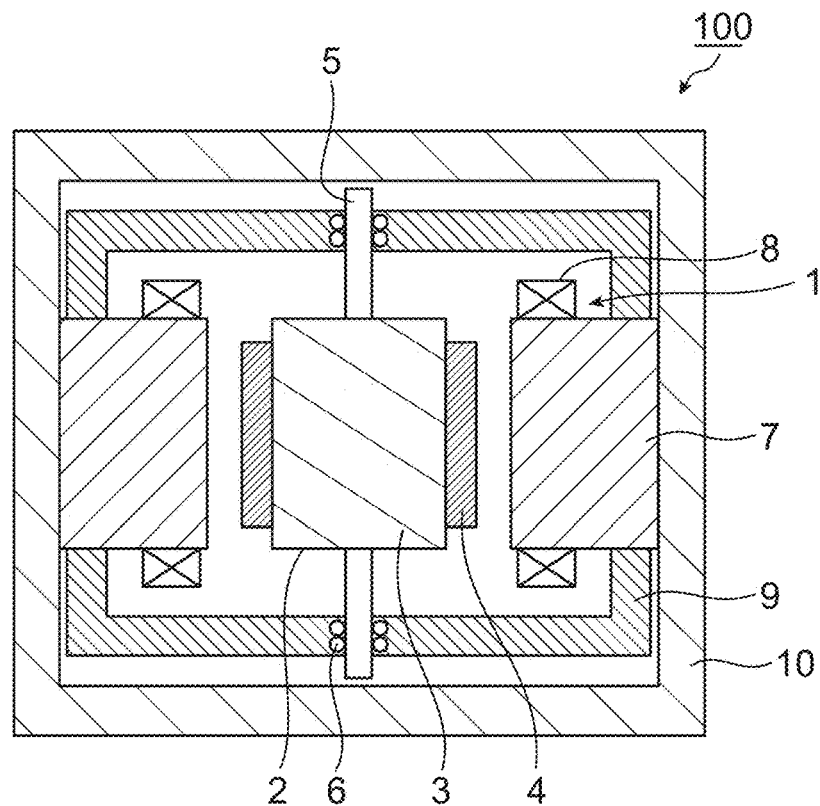
FIG. 1 is a configuration diagram illustrating a configuration of a flux-modulating hybrid field motor which is an example of a rotating electric machine according to a first embodiment.

FIG. 1 is a configuration diagram illustrating a configuration of a flux-modulating hybrid field motor which is an example of a rotating electric machine 100 according to a first embodiment. As illustrated in FIG. 1, the rotating electric machine 100 according to the first embodiment includes a stator 1 formed in an annular shape and a rotor 2 provided to face the stator 1.

The rotor 2 is provided inside the stator 1 in the radial direction. Hereinafter, the radial direction of the rotor 2 is simply referred to as "radial direction", the circumferential direction of the rotor 2 is simply referred to as "circumferential direction", and the axial direction of the rotation axis of the rotor 2 is simply referred to as "axial direction". The rotor 2 includes a rotor core 3 and a plurality of permanent magnets 4 attached to an outer peripheral surface of the rotor core 3.

A shaft 5 extending in the rotation axis direction is press-fitted into the rotor core 3. The shaft 5 is connected to a stator bracket 9 via one or more bearings 6.

The stator 1 includes a stator core 7, a plurality of coils 8 provided in the stator core 7, and the stator bracket 9.

The stator core 7 is connected to the stator bracket 9 covering the entire permanent magnet synchronous motor by a method such as press-fitting or bonding. In addition, the stator bracket 9 is in contact with a cover 10, and serves to prevent scattering of the rotor 2, fix the permanent magnet synchronous motor, and cool heat generation of the stator 1.

Figure 2:
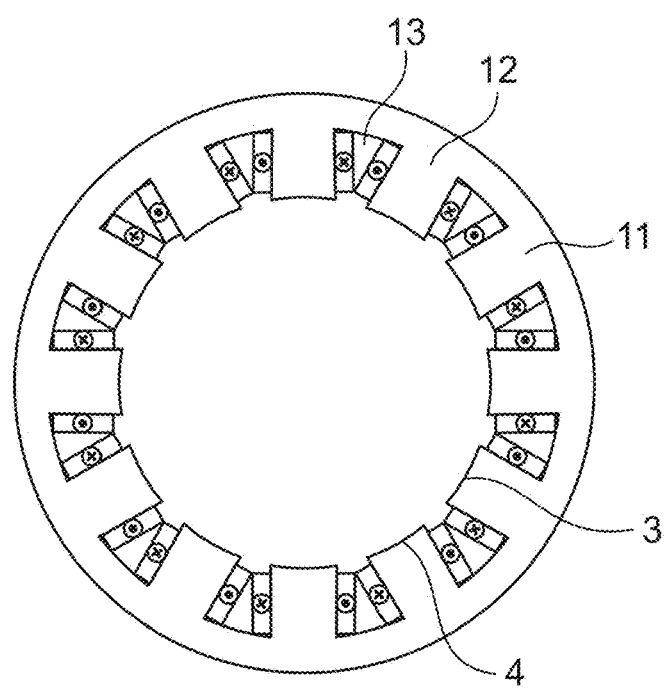
FIG. 2 is a cross-sectional view No. 1 of the rotating electric machine according to the first embodiment.

FIG. 2 is a cross-sectional view No. 1 of the rotating electric machine 100 according to the first embodiment. FIG. 2 illustrates a shape related to an electromagnetic function in the stator 1 of the rotating electric machine 100. As illustrated in FIG. 2, the stator core 7 includes a core back 11 formed in an annular shape and a plurality of teeth 12 protruding inward in the radial direction from the core back 11.

The plurality of teeth 12 are arranged at equal intervals in the circumferential direction. A plurality of slots 13 are formed between the plurality of teeth 12 adjacent in the circumferential direction. The coil 8 is stored in the plurality of slots 13. In the rotor 2, the plurality of permanent magnets 4 are arranged in the circumferential direction on the radially outer side of the rotor core 3, and is connected to the rotor core 3.

Figure 3:
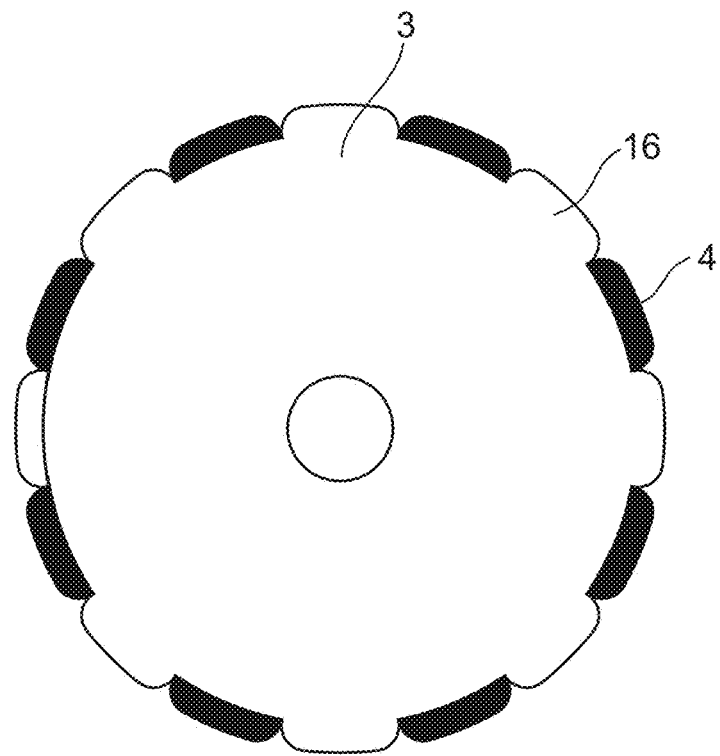
FIG. 3 is a cross-sectional view No. 2 of the rotating electric machine according to the first embodiment.

FIG. 3 is a cross-sectional view No. 2 of the rotating electric machine 100 according to the first embodiment. FIG. 3 illustrates a shape related to an electromagnetic function in the rotor 2 of the rotating electric machine 100. As illustrated in FIG. 3, the rotor 2 includes the rotor core 3 and the permanent magnet 4 attached to the surface of the rotor core 3. In addition, the rotor core 3 has protrusions 16 alternately formed between the permanent magnets 4.

The shape of the protrusion 16 illustrated in FIG. 3 is substantially rectangular, but may be an arc shape. Further, the curvature of the curve where the protrusion 16 and the air gap are in contact with each other may be different from the outermost peripheral outer diameter of the rotor 2. Further, the tip portion of the protrusion 16 may be formed of an arc having a different curvature on the fillet. The shape of these protrusions 16 is designed to adjust harmonics of the magnetic flux formed by the field winding F to a desired value.

The permanent magnet 4 may form a corner on the fillet. By forming the corner on the fillet, it can be expected to reduce the eddy current loss generated at the tip portion of the permanent magnet 4. In addition, the curvature of the outer peripheral shape of the permanent magnet 4 may also be different from the outermost peripheral outer diameter of the rotor 2.

Figure 4:
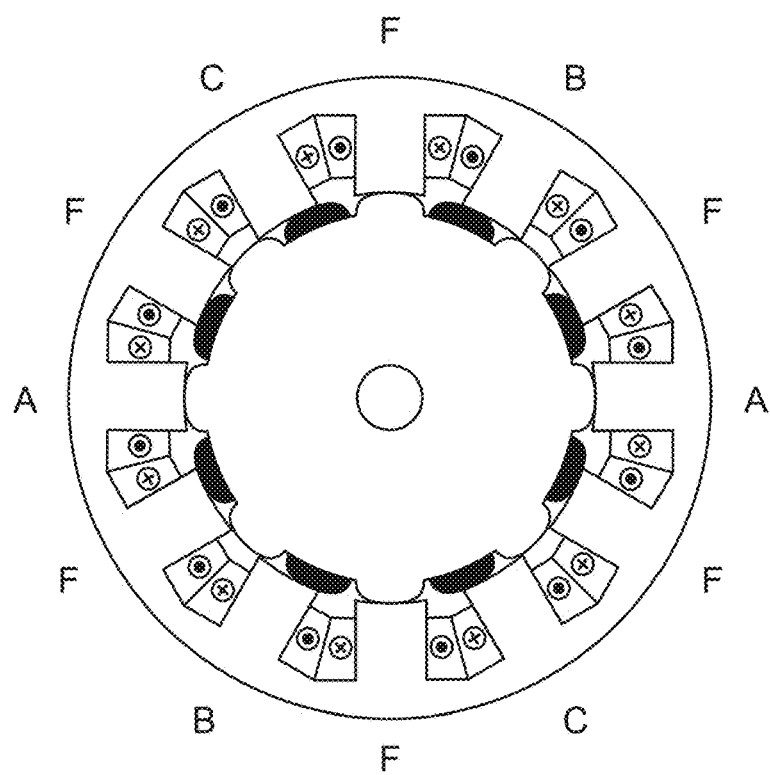
FIG. 4 is a schematic diagram illustrating an outline of connection of the rotating electric machine according to the first embodiment.

FIG. 4 is a schematic diagram illustrating an outline of connection of the rotating electric machine 100 according to the first embodiment. FIG. 4 illustrates that the A-phase, the B-phase, and the C-phase of the armature winding are three-phase AC windings having a phase difference of 120 degrees.

The field winding F illustrated in FIG. 4 is a DC field winding. In the example of the first embodiment, all the phases of the armature winding are wound in the same direction, and the magnetic flux by the armature forms the consequent pole. This is because the armature magnetic flux of the ABC-phase of the armature winding interlinks with the rotor core 3 via the teeth 12 around which the field winding F is wound, and returns to the teeth 12 around which the ABC-phase of the armature winding is wound again to form a pole in the air gap. Similarly, the winding directions of field windings F are all the same. The field magnetic flux generated by the field winding F interlinks with the rotor core 3 via the teeth 12 around which the armature winding ABC-phase is wound, and returns to the teeth 12 around which the field winding F is wound again, thereby forming a field pole.

Figure 5:
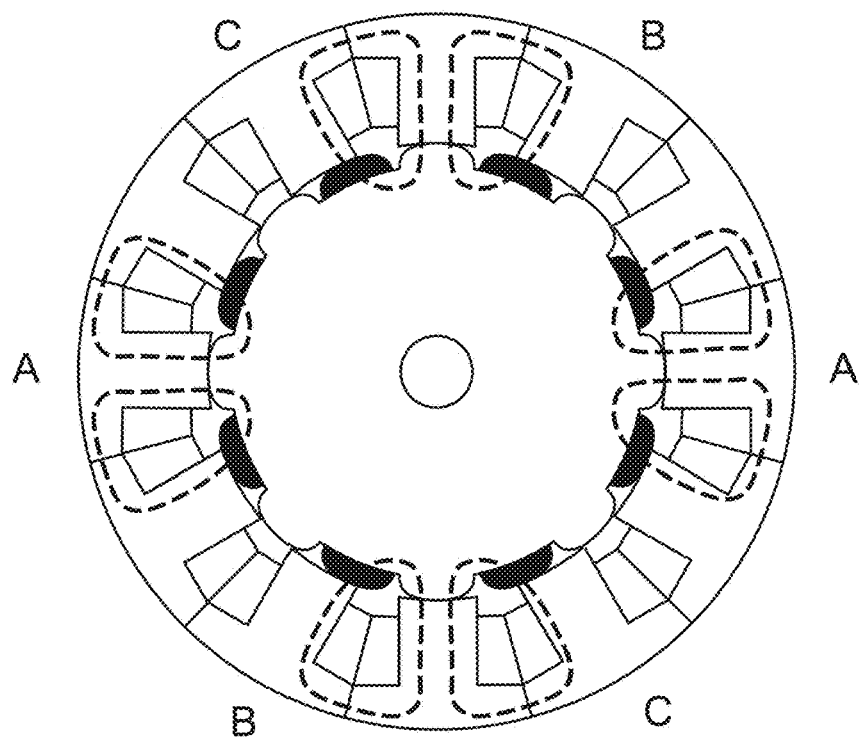
FIG. 5 is a magnetic flux line diagram No. 1 by a permanent magnet at an electric angle No. 1 of the rotating electric machine according to the first embodiment.

FIG. 5 is a magnetic flux line diagram No. 1 of the permanent magnet 4 at an electric angle No. 1 of the rotating electric machine 100 according to the first embodiment. The polarities of the permanent magnets 4 illustrated in FIG. 5 are all the same, and here, all are N poles. The magnetic flux generated from the permanent magnet 4 passes through the core back 11 via the teeth 12 of the stator 1, and returns to the permanent magnet 4 through the protrusions 16 arranged between the permanent magnets 4. That is, each of the protrusions 16 functions as an S pole in the permanent magnet 4.

Figure 6:
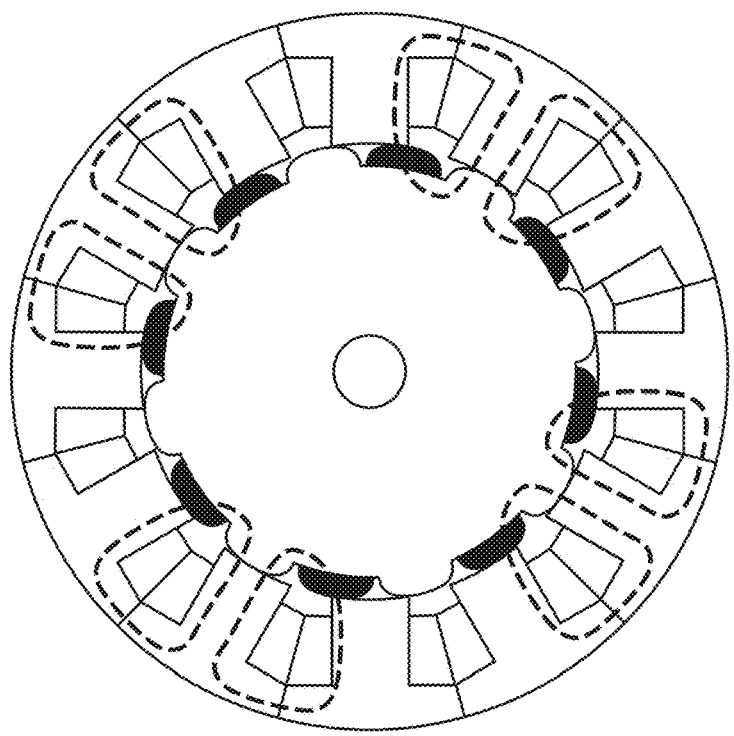
FIG. 6 is a magnetic flux line diagram No. 2 by a permanent magnet at an electric angle No. 2 of the rotating electric machine according to the first embodiment.

Focusing on the armature winding ABC-phase of the stator 1, it can be confirmed that there are four magnetic flux loops. This can be similarly confirmed in FIG. 6 in which the electric angles are different. That is, magnetic fluxes of four poles are formed. FIG. 6 is a magnetic flux line diagram No. 2 by the permanent magnet 4 at an electric angle No. 2 of the rotating electric machine 100 according to the first embodiment. Note that, FIGS. 5 and 6 illustrate a case where the ratio between the number of modulated poles and the number of slots of the armature winding is 2:3 in the field poles formed in the plurality of protrusions 16 by the energization to the armature winding and the field winding, and the plurality of permanent magnets 4. In the rotating electric machine according to the present disclosed technology, a configuration example is conceivable in which $P_f \div P_a = 3$ or $P_f \div P_a = 1.5$ is satisfied, where $P_a$ is the number of pole pairs of the armature winding of the stator 1, and $P_f$ is the number of pole pairs of the field winding F of the direct current.

Figure 7:
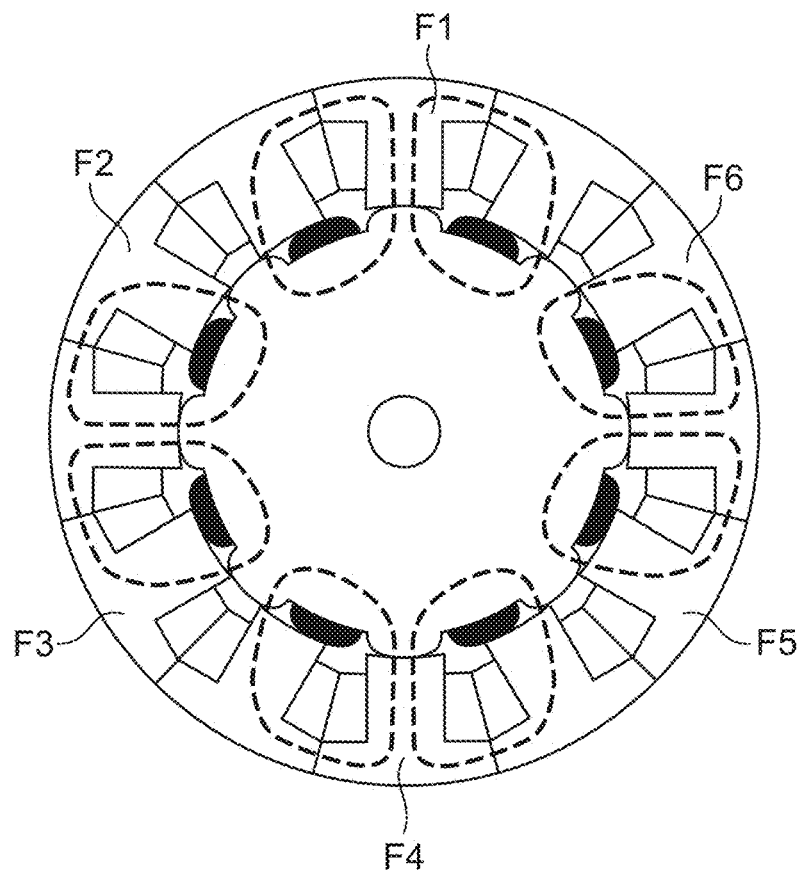
FIG. 7 is a magnetic flux line diagram No. 1 when field windings F (F1 to F6) at the electric angle No. 1 of the rotating electric machine according to the first embodiment are energized.

FIG. 7 is a magnetic flux line diagram No. 1 when the field windings F (F1 to F6) at the electric angle No. 1 of the rotating electric machine 100 according to the first embodiment are energized. As illustrated in FIG. 7, since the winding directions of the field windings F are all the same, a field magnetic flux of 12 poles is generated.

Figure 8:
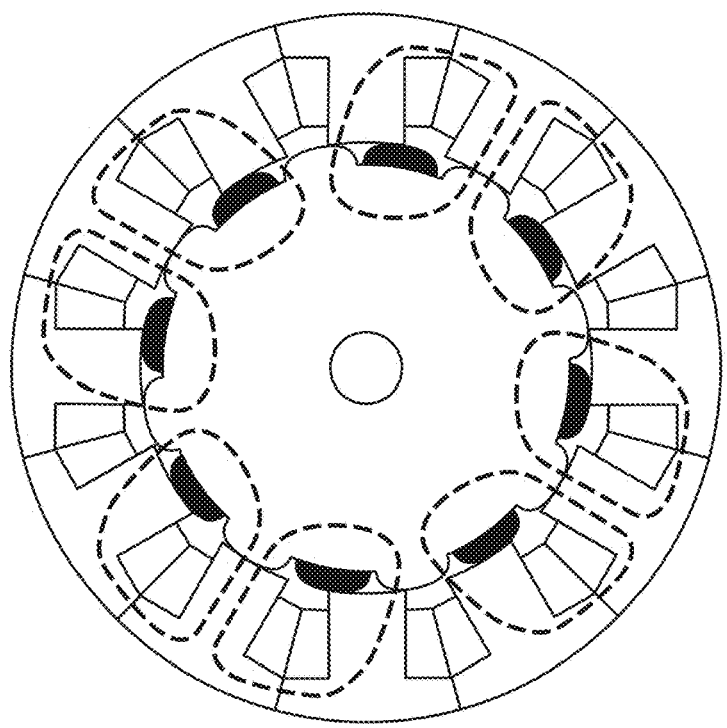
FIG. 8 is a magnetic flux line diagram No. 2 when field windings F (F1 to F6) at the electric angle No. 2 of the rotating electric machine according to the first embodiment are energized.

Assuming that the number of pole pairs of the field windings F of the direct current is $P_f$, FIG. 7 shows $P_f = 6$. Since the number of protrusions 16 in the rotor 2 is eight, when the number of poles of the consequent pole is $P_r$, $P_r = 8$. The number of poles of the field magnetic flux is modulated by the permeance variation of the protrusions 16, and $2P_r - 2P_f = 4$. Therefore, as illustrated in FIG. 7, magnetic fluxes of four poles are formed in the core back 11 of the stator 1. The same applies to the magnetic flux line diagram in FIG. 8 in which the electric angle is changed. FIG. 8 is a magnetic flux line diagram No. 2 when the field windings F (F1 to F6) at the electric angle No. 2 of the rotating electric machine 100 according to the first embodiment are energized. Note that, in other words, $P_r$ represents the number of poles of the field pole formed by the permanent magnet 4 and the protrusion 16.

Figure 9:
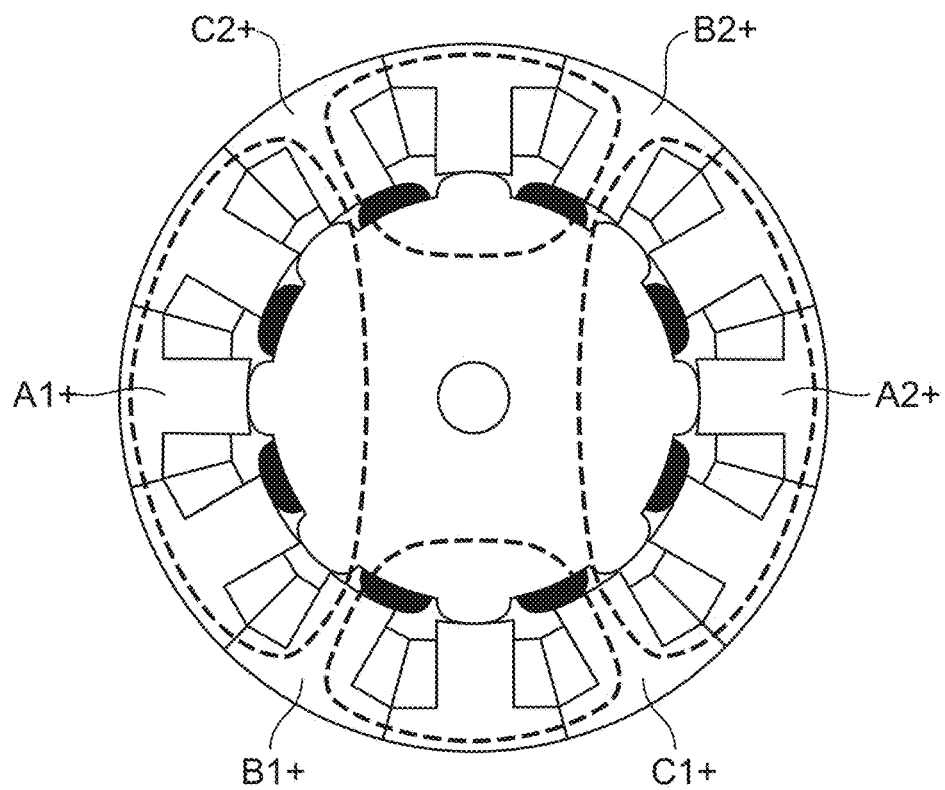
FIG. 9 is a magnetic flux line diagram No. 1 when the armature winding of the rotating electric machine according to the first embodiment is energized.
Figure 10:
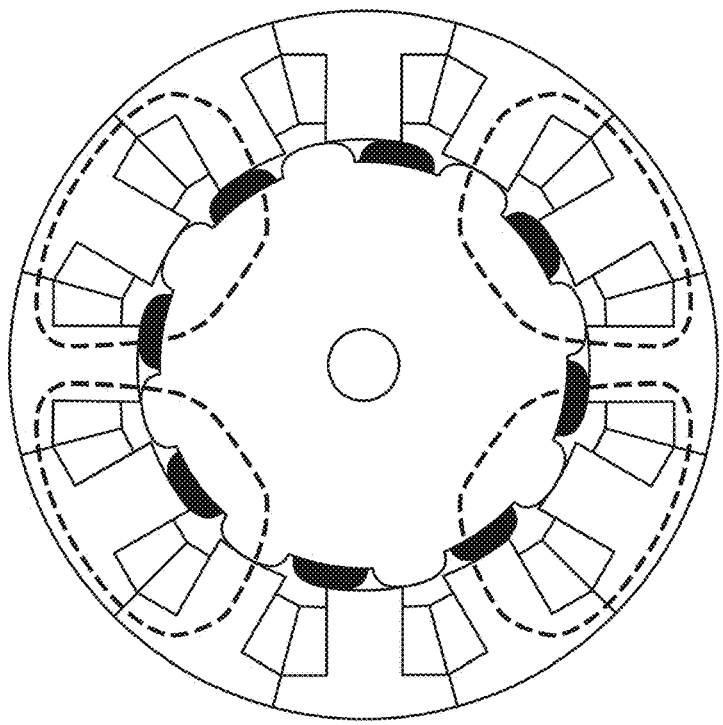
FIG. 10 is a magnetic flux line diagram No. 2 when the armature winding of the rotating electric machine according to the first embodiment is energized.

FIG. 9 is a magnetic flux line diagram No. 1 when the armature winding of the rotating electric machine 100 according to the first embodiment is energized. As illustrated in FIG. 9, all the armature windings are wound in the same direction, and there are two windings of each phase. Assuming that the number of pole pairs of the armature windings of the stator 1 is $P_a$, in FIG. 9, $P_a$ indicates that magnetic fluxes of four poles are formed. The same applies to FIG. 10 in which the electric angle is changed. FIG. 10 is a magnetic flux line diagram No. 2 when the armature winding of the rotating electric machine 100 according to the first embodiment is energized. In order to generate torque by synchronizing magnetic fluxes of the field winding and the permanent magnet 4 with magnetic fluxes of the armature winding, it is necessary to satisfy $P_a + P_f = P_r$.

Figure 11:
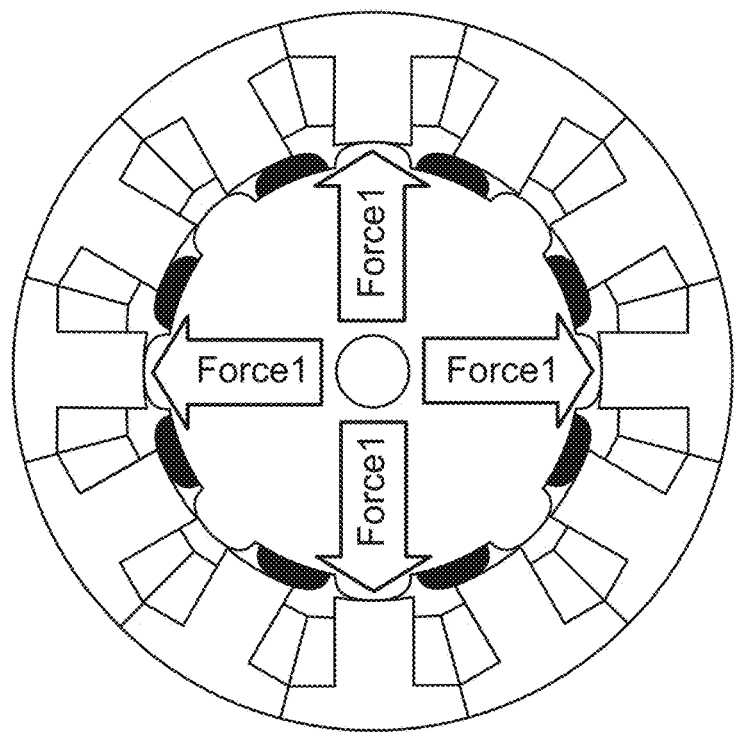
FIG. 11 is a schematic diagram No. 1 illustrating an electromagnetic force acting on a rotor of the rotating electric machine according to the first embodiment.

FIG. 11 is a schematic diagram No. 1 illustrating electromagnetic forces acting on the rotor 2 of the rotating electric machine 100 according to the first embodiment. FIG. 11 illustrates that when $P_r = 8$, the symmetry of the stator 1 and the rotor 2 is established, and the electromagnetic forces are balanced.

Figure 12:
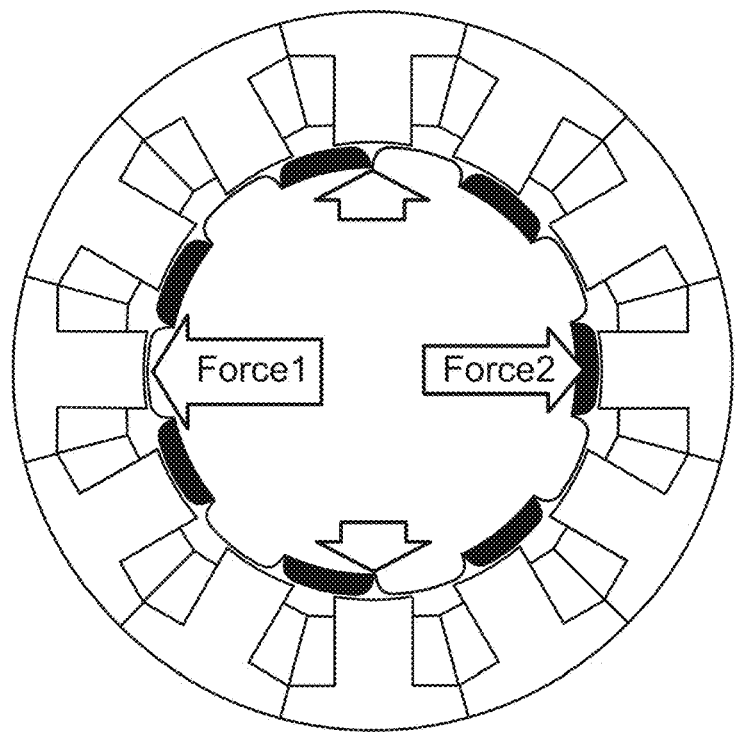
FIG. 12 is a schematic diagram No. 2 illustrating the electromagnetic force acting on the rotor of the rotating electric machine according to the first embodiment.

FIG. 12 is a schematic diagram No. 2 illustrating the electromagnetic forces acting on the rotor 2 of the rotating electric machine 100 according to the first embodiment. FIG. 12 illustrates that, when $P_r = 7$, the stator 1 is not symmetric with respect to the rotor 2, so that electromagnetic forces are not balanced between the left and right, and an unbalanced magnetic attractive force that promotes axial eccentricity is generated. That is, in order not to generate the unbalanced magnetic attractive force, $P_r$ needs to be an even number.

Figure 13:
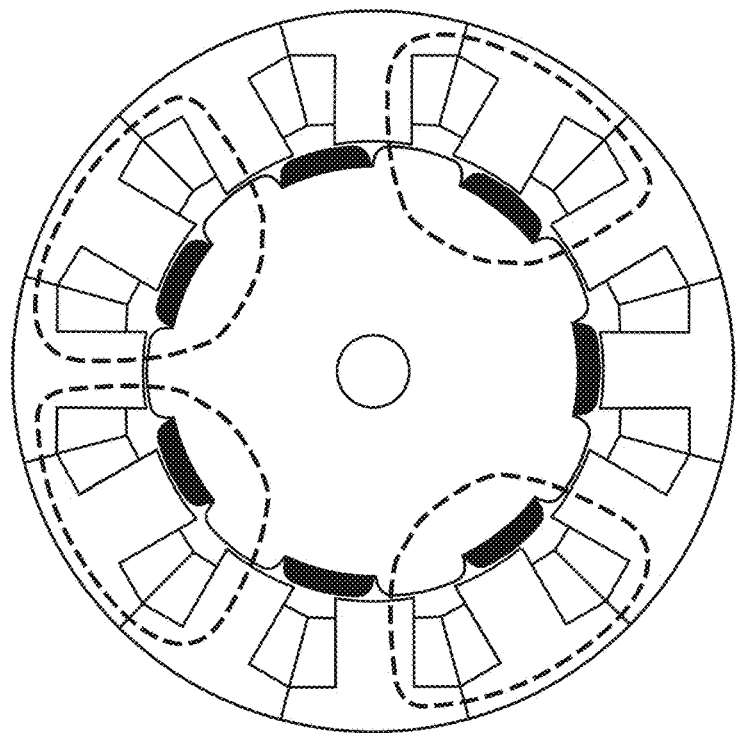
FIG. 13 is a magnetic flux line diagram when a current is applied to a field winding when the number of poles of a consequent pole of the rotating electric machine according to the first embodiment is seven.

FIG. 13 is a magnetic flux line diagram when a current is applied to the field winding F when $P_r$ of the rotating electric machine 100 according to the first embodiment is seven. As can be seen by comparison with FIG. 7, FIG. 13 shows that the magnetic flux lines are asymmetric with respect to the rotation axis. This is because in FIG. 13, $|P_r - P_f| = 1$, and a magnetic flux of spatial first order is generated. FIG. 13 illustrates that $|P_r - P_f| \neq 1$ is required to generate no unbalanced magnetic attractive force.

Figure 17:
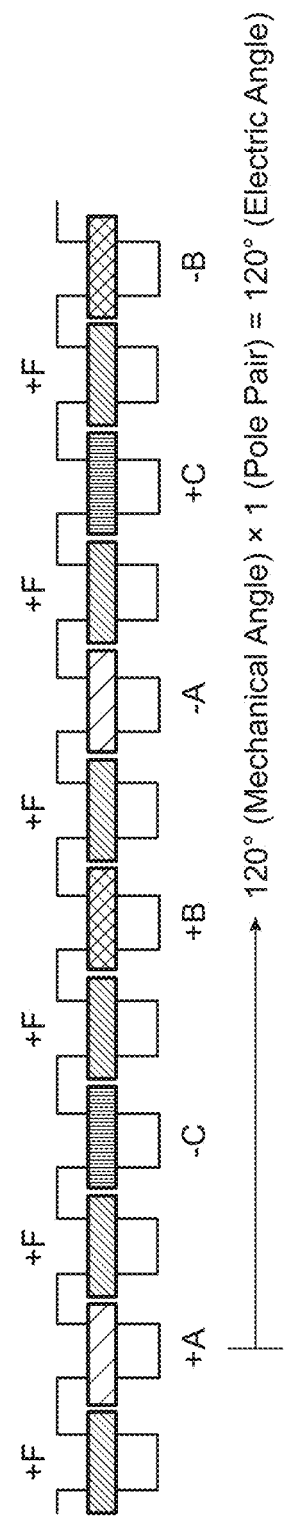
FIG. 17 is a developed schematic diagram of the stator teeth when the number of poles of the consequent pole is six, the number of pole pairs of the armature winding of the stator is one, and the number of pole pairs of the DC field winding is seven.

FIG. 17 is a developed schematic diagram of the teeth 12 of the stator 1 when $P_r$ is seven, $P_a$ is one, and $P_f$ is six. The example of FIG. 17 illustrates that in the armature winding, the A-phase, the B-phase, and the C-phase are arranged every other tooth 12 to form two poles. In addition, the field windings F are arranged between the armature windings to form 12 poles. As a result, a magnetic field of $2P_a + 2P_f = 14$ poles is formed, and rotational torque synchronized with the rotor 2 in which $P_r$ is seven is generated. At this time, since the absolute value of the difference between the number of pole pairs of the armature and the number of pole pairs of the field windings F is one, that is, $|P_r - P_f| = 1$, a magnetic flux of the spatial first order is generated. The magnetic flux of spatial first order generates an unbalanced magnetic attraction force. In order not to generate the unbalanced magnetic attractive force, $|P_r - P_f| \neq 1$ needs to be satisfied.

Figure 14:
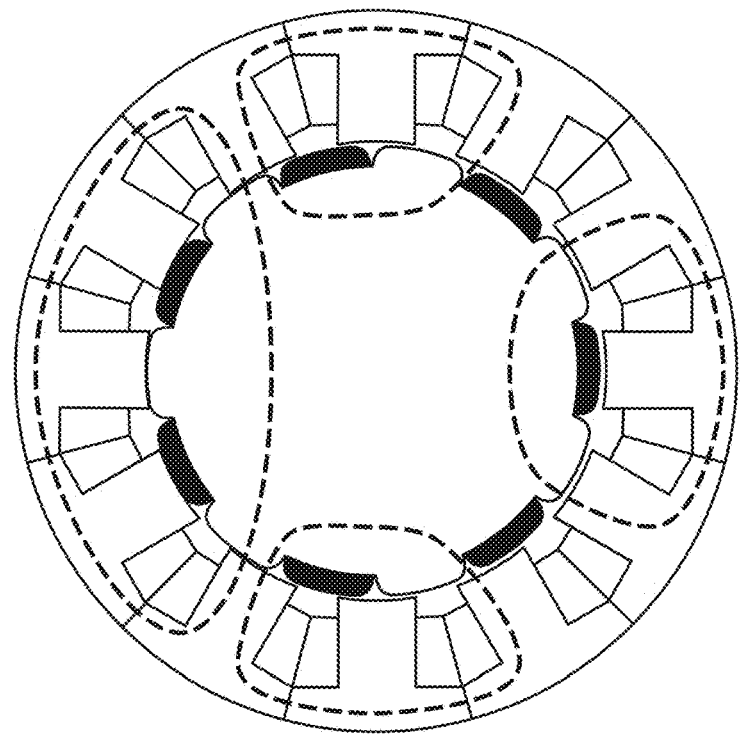
FIG. 14 is a magnetic flux line diagram when a current is applied to the armature winding when the number of poles of the consequent pole of the rotating electric machine according to the first embodiment is seven.

FIG. 14 is a magnetic flux line diagram when a current is applied to the armature winding of the rotating electric machine 100 according to the first embodiment when $P_r$ is seven. As can be seen by comparison with FIG. 9, FIG. 14 shows that the magnetic flux lines are asymmetric with respect to the rotation axis. This is because in FIG. 14, $|P_a - P_r| = 1$, and a magnetic flux of spatial first order is generated. FIG. 14 illustrates that $|P_a - P_r| \neq 1$ is required in order not to generate the unbalanced magnetic attractive force.

Figure 15:
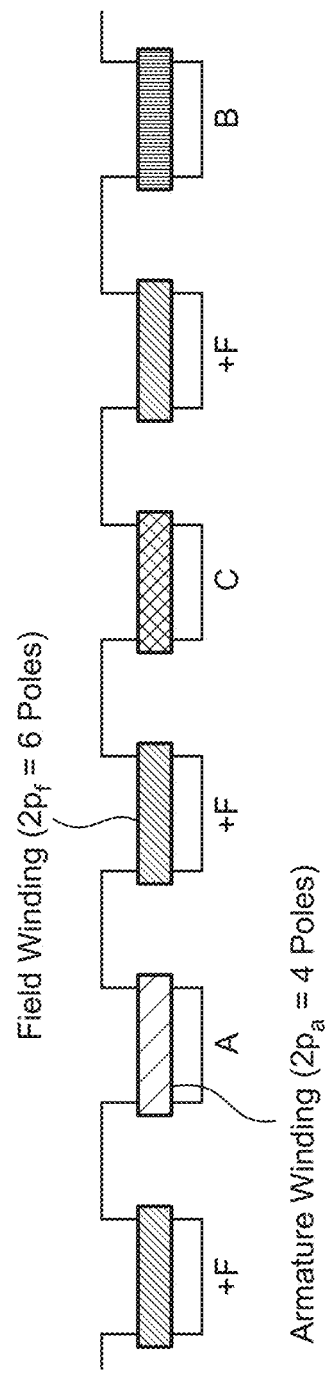
FIG. 15 is a developed schematic diagram of stator teeth when the number of poles of the consequent pole is five, the number of pole pairs of the armature winding of the stator is two, and the number of pole pairs of the DC field winding is three.

FIG. 15 is a developed schematic diagram of the teeth 12 of the stator 1 when $P_r$ is five, $P_a$ is two, and $P_f$ is three. In the armature winding illustrated in FIG. 15, the A-phase, B-phase, and the C-phase are arranged to form four poles. In addition, the field windings F are arranged between the armature windings to form six poles. As a result, magnetic fields of $2P_a + 2P_f = 10$ poles are formed, and rotational torque synchronized with the rotor 2 in which $P_r$ is five is generated. At this time, since the absolute value of the difference between the number of pole pairs of the armature and the number of pole pairs of the field windings F is one, that is, $|P_a - P_r| = 1$, a magnetic flux of spatial first order is generated. The magnetic flux of spatial first order generates an unbalanced magnetic attraction force. In order not to generate the unbalanced magnetic attractive force, $|P_a - P_r| \neq 1$ needs to be satisfied. For example, even when $P_a + P_f = P_r$ is satisfied in such a manner that $P_a$ is four, $P_f$ is three, and $P_r$ is seven, if $|P_a-P_f|=1$ is satisfied, a magnetic flux of spatial first order is generated, and an unbalanced magnetic attractive force is generated.

Figure 16:
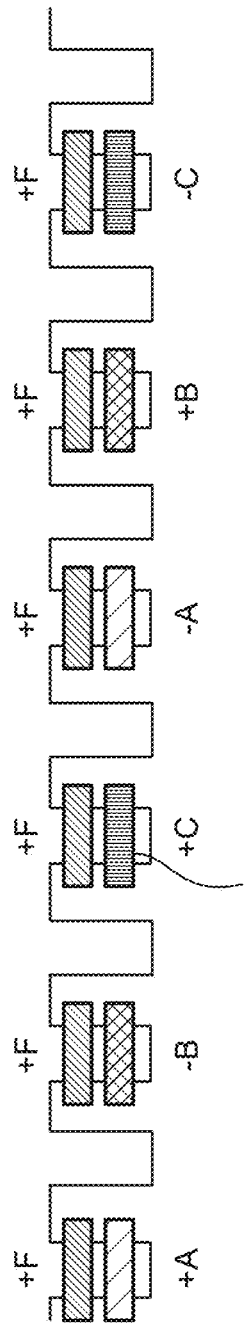
FIG. 16 is a developed schematic diagram of the stator teeth when the number of poles of the consequent pole is 11, the number of pole pairs of the armature winding of the stator is five, and the number of pole pairs of the DC field winding is six.

FIG. 16 is a developed schematic diagram of the teeth 12 of the stator 1 when $P_r$ is 11, $P_a$ is five, and $P_f$ is six. In the armature winding illustrated in FIG. 16, the A-phase, the B-phase, and the C-phase are arranged in each of the teeth 12 to form 10 poles. In addition, the field windings F are also wound around each of the teeth 12 to form 12 poles. As a result, magnetic fields of $2P_a+2P_f=22$ poles are formed, and rotational torque synchronized with the rotor 2 in which $P_r$ is 11 is generated. At this time, since the absolute value of the difference between the number of pole pairs of the armature and the number of pole pairs of the field windings F is one, that is, $|P_a-P_f|=1$, a magnetic flux of spatial first order is generated. The magnetic flux of spatial first order generates an unbalanced magnetic attraction force. In order not to generate the unbalanced magnetic attractive force, $|P_a-P_f|\neq 1$ needs to be satisfied.

In summary, the condition for generating the unbalanced magnetic attractive force in principle is that the number of pole pairs $P_a$ of the armature winding, the number of pole pairs $P_f$ of the field winding F, and the number of poles $P_r$ of the field pole formed by the plurality of permanent magnets 4 and the plurality of protrusions 16 satisfy all of the following expressions (1) to (3) and condition (4).

$$|P_a-P_f|\neq 1 \quad (1)$$

$$|P_r-P_f|\neq 1 \quad (2)$$

$$|P_a-P_r|\neq 1 \quad (3)$$

$P_r$ is an even number. (4)

Since the rotating electric machine 100 according to the first embodiment has the above configuration, the unbalanced magnetic attractive force is not generated, and the rotation axis eccentricity and the vibration are suppressed.

Second Embodiment

A rotating electric machine 100 according to a second embodiment is obtained by devising the arrangement of the permanent magnets 4 in the rotating electric machine 100 according to the first embodiment. Elements common to the first embodiment are denoted by the same reference numerals, and redundant description will be omitted as appropriate.

Figure 18:
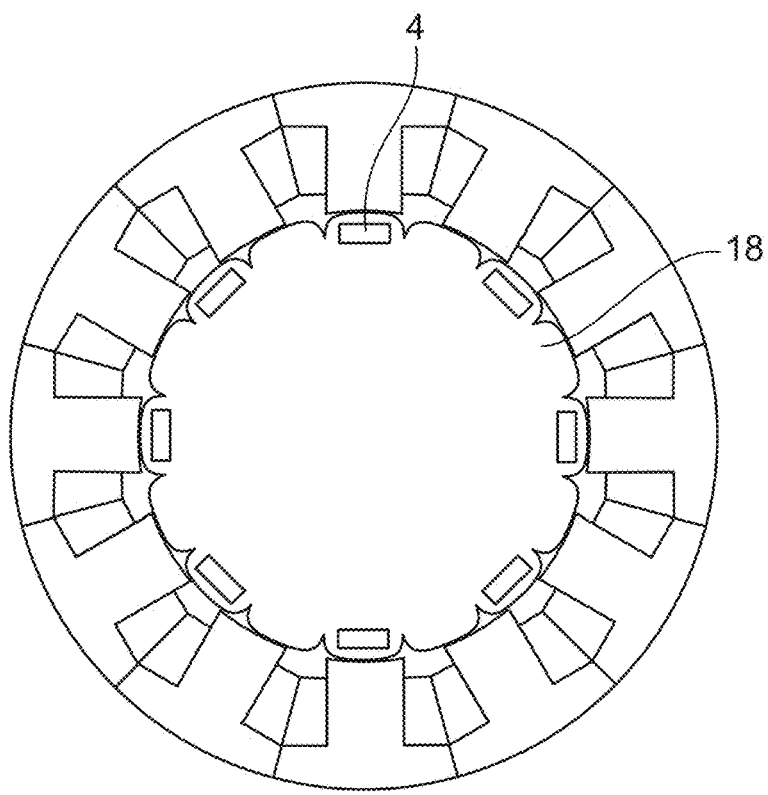
FIG. 18 is a cross-sectional view of a rotating electric machine according to a second embodiment.

FIG. 18 is a cross-sectional view of the rotating electric machine 100 according to the second embodiment. As illustrated in FIG. 18, the rotating electric machine 100 according to the second embodiment includes a rotor 2, and the rotor 2 includes a core 18 and a permanent magnet 4. The rotating electric machine 100 according to the second embodiment is characterized in that the permanent magnet 4 is embedded in the core 18. By embedding the permanent magnet 4 in the core 18, the spatial harmonic magnetic flux generated in the vicinity of the air gap can be prevented from interlinking with the permanent magnet 4, and the eddy current loss generated in the permanent magnet 4 can be reduced. In addition, the core 18 may have one or more holes in which the permanent magnet 4 is embedded for each pole, and may have a hole shape in which the permanent magnet 4 is disposed in a V shape.

Since the rotating electric machine 100 according to the second embodiment has the above-described configuration, it has an effect of suppressing an eddy current loss in addition to the effect described in the first embodiment.

Third Embodiment

A rotating electric machine 100 according to a third embodiment is also obtained by devising the arrangement of the permanent magnets 4 in the rotating electric machine 100 according to the first embodiment. Elements common to the first embodiment and the second embodiment are denoted by the same reference numerals, and redundant description will be omitted as appropriate.

Figure 19:
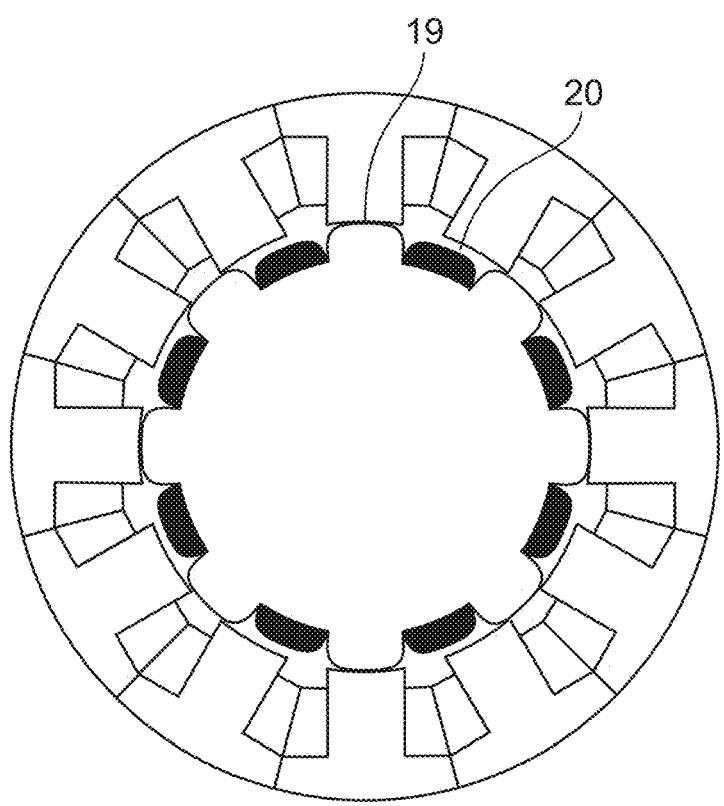
FIG. 19 is a cross-sectional view of a rotating electric machine according to a third embodiment.

FIG. 19 is a cross-sectional view of the rotating electric machine 100 according to the third embodiment. As illustrated in FIG. 19, in the rotating electric machine 100 according to the third embodiment, similarly to the configuration of the first embodiment, a rotor 2 includes a rotor core 3 and a permanent magnet 4 attached to the surface of the rotor core 3.

In the rotating electric machine 100 according to the third embodiment, the rotor core 3 is configured to have protrusions 16 alternately formed between the permanent magnets 4. As illustrated in FIG. 19, a protrusion air-gap length 19 is the shortest distance between the protrusion 16 and a stator 1, and a permanent magnet portion air-gap length 20 is the shortest distance between the permanent magnet 4 and the stator 1. As described above, in the rotating electric machine 100 according to the present disclosed technology, the protrusion air-gap length 19 and the permanent magnet portion air-gap length 20 may be different. Even if the protrusion air-gap length 19 and the permanent magnet portion air-gap length 20 are different, there is no influence on the unbalanced magnetic attractive force as long as the configuration of the first embodiment is satisfied.

Since the rotating electric machine 100 according to the third embodiment has the above-described configuration, the protrusion air-gap length 19 can be increased, and the eddy current loss generated in the permanent magnet 4 can be reduced.

Fourth Embodiment

A rotating electric machine 100 according to a fourth embodiment is also obtained by devising the ratio between the width of the protrusion 16 and the width of the permanent magnet 4 in the rotating electric machine 100 according to the first embodiment. The same reference numerals are used for elements common to the above-described embodiments, and redundant description will be omitted as appropriate.

Figure 20:
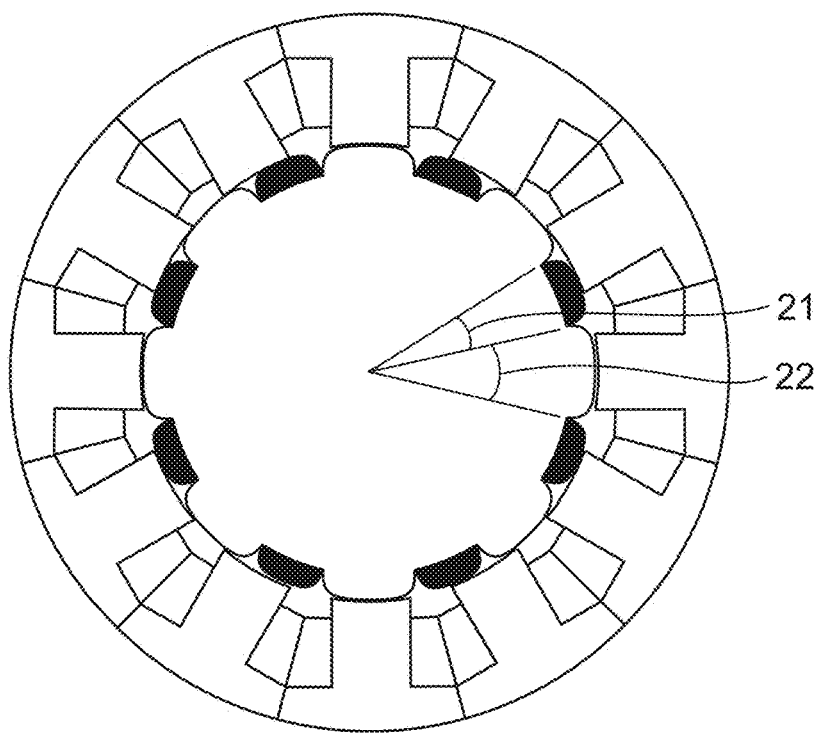
FIG. 20 is a cross-sectional view of a rotating electric machine according to a fourth embodiment.

FIG. 20 is a cross-sectional view of the rotating electric machine 100 according to the fourth embodiment. As illustrated in FIG. 20, in the rotating electric machine 100 according to the fourth embodiment, similarly to the configuration of the first embodiment, a rotor 2 includes a rotor core 3 and a permanent magnet 4 attached to the surface of the rotor core 3.

In FIG. 20, a permanent magnet portion angle 21 and a protrusion angle 22 are described so that the ratio of the widths of the permanent magnet 4 and the protrusion 16 can be expressed. The permanent magnet portion angle 21 is an angle between two straight lines connecting both ends of a line segment forming the circumferential maximum length of each permanent magnet 4 and the rotation axis center. In addition, the protrusion angle 22 is an angle between two straight lines connecting both ends of a line segment forming the circumferential maximum length of the protrusion 16 and the rotation axis center. As described above, in the rotating electric machine 100 according to the present disclosed technology, the permanent magnet portion angle 21 and the protrusion angle 22 may be different. Even if the permanent magnet portion angle 21 and the protrusion angle 22 are different, there is no influence on the unbalanced magnetic attractive force as long as the configuration of the first embodiment is satisfied.

If the permanent magnet portion angle 21 is increased, the amount of magnetic flux by the permanent magnet 4 can be increased. Conversely, if the protrusion angle 22 is increased, the amount of field magnetic flux by the field winding F can be increased. With the above configuration, the rotating electric machine 100 according to the fourth embodiment can adjust the amount of magnetic flux and the amount of field magnetic flux.

Fifth Embodiment

A rotating electric machine 100 according to a fifth embodiment is also an example of the rotating electric machine 100 according to the present disclosed technology. The same reference numerals are used for elements common to the above-described embodiments, and redundant description will be omitted as appropriate.

Figure 21:
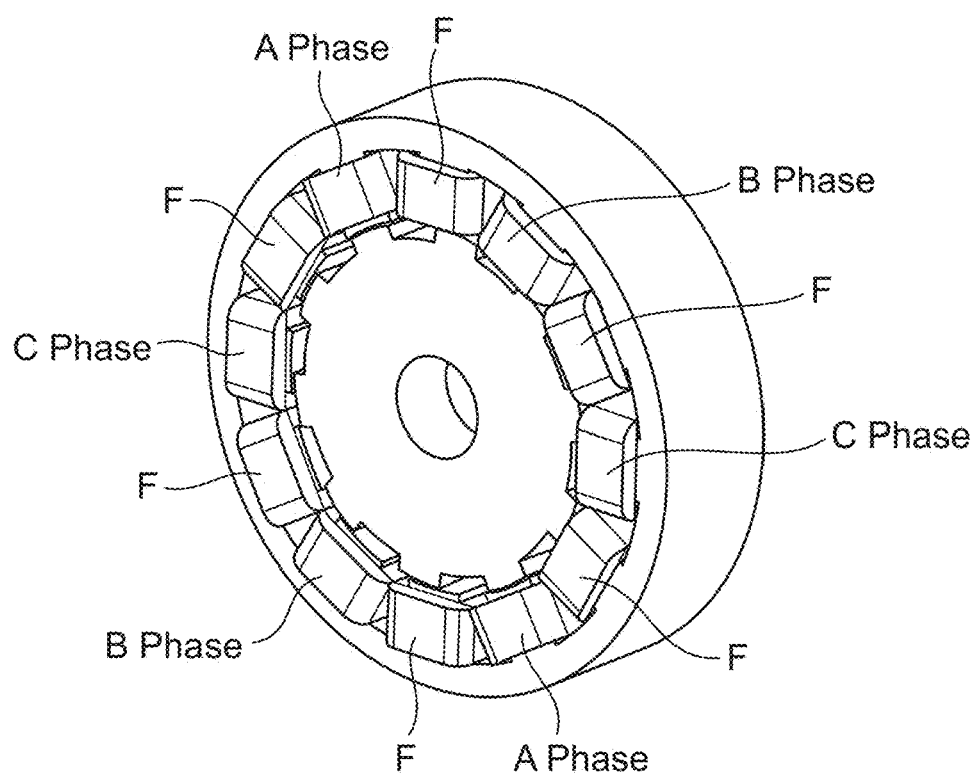
FIG. 21 is an overhead view of an entire rotating electric machine according to a fifth embodiment.

FIG. 21 is an overhead view of the entire rotating electric machine according to the fifth embodiment. As illustrated in FIG. 21, the entire rotating electric machine according to the fifth embodiment is configured such that the A-phase, the B-phase, and the C-phase of the armature winding sandwich the field winding F therebetween, similarly to the configuration of the stator 1 of the first embodiment.

Figure 22:
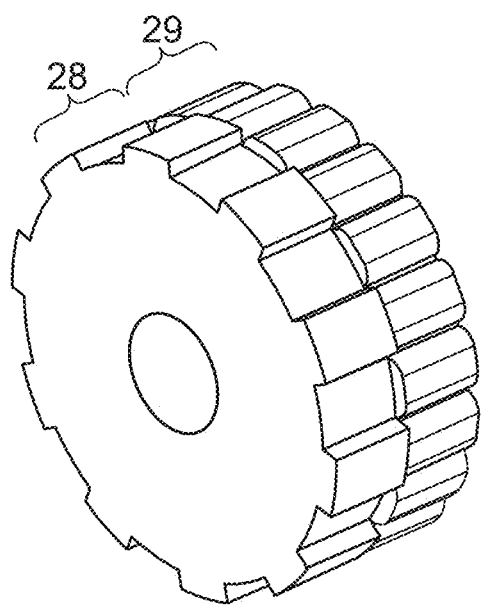
FIG. 22 is an overhead view of a rotor according to the fifth embodiment.

FIG. 22 is an overhead view of a rotor 2 according to the fifth embodiment. As illustrated in FIG. 22, in the entire rotating electric machine according to the fifth embodiment, a rotor 2 includes a protrusion rotor unit 28 and a permanent magnet rotor unit 29, and the protrusion rotor unit 28 and the permanent magnet rotor unit 29 are assembled side by side in the axial direction.

A pole of the permanent magnet rotor unit 29 is formed by a permanent magnet 4. The permanent magnet 4 may be embedded in a core 18 as described in the configuration of the second embodiment.

On the other hand, the protrusion rotor unit 28 includes only protrusions 16 of the rotor core, and the number of the protrusions 16 is half the number of the permanent magnets 4 in the example illustrated in FIG. 22.

The rotating electric machine 100 according to the fifth embodiment is also configured to satisfy $P_a+P_f=P_r$. Since the rotating electric machine 100 according to the fifth embodiment has the above-described configuration, torque can be obtained by reluctance torque generated by a difference in inductance that changes depending on a rotational position.

INDUSTRIAL APPLICABILITY

The present disclosed technology can be applied to a driving motor including an EV, and has industrial applicability.

REFERENCE SIGNS LIST

1: stator, 2: rotor, 3: rotor core, 4: permanent magnet, 5: shaft, 6: bearing, 7: stator core, 8: coil, 9: stator bracket, 10: cover, 11: core back, 12: tooth, 13: slot, 16: protrusion, 18: core, 19: protrusion air-gap length, 20: permanent magnet portion air-gap length, 21: permanent magnet portion angle, 22: protrusion angle, 28: protrusion rotor unit, 29: permanent magnet rotor unit, 100: rotating electric machine, F: field winding

The invention claimed is:

1. A rotating electric machine comprising:
a stator; and
a rotor, wherein
the rotor includes a plurality of permanent magnets arranged in a circumferential direction of a rotation axis and a plurality of protrusions arranged in the circumferential direction,
the stator includes a plurality of teeth, an armature winding wound around the plurality of teeth, and a field winding F wound around the plurality of teeth,
a field pole is formed in the plurality of protrusions by energization to the field winding and the plurality of permanent magnets,
the plurality of permanent magnets and the plurality of teeth are alternately arranged at intervals in the circumferential direction to form the field pole,
all the permanent magnets have the same polarity,
$P_a$ the number of pole pairs of the armature winding, $P_f$ the number of pole pairs of the field winding, and $P_r$ the number of poles of the field pole formed by the plurality of permanent magnets and the plurality of protrusions, satisfy all of $|P_a-P_f|\neq1$, $|P_r-P_f|\neq1$, $|P_a-P_r|\neq1$, and $P_f+P_a=P_r$,
$P_r$ is an even number, and
in the field pole formed in the plurality of protrusions by energization to the armature winding and the field winding and the plurality of permanent magnets, the number of pole pairs $P_a$ and the number of pole pairs $P_f$ satisfy $P_f \div P_a=3$ or $P_f \div P_a=1.5$.

2. The rotating electric machine according to claim 1, wherein the plurality of permanent magnets is embedded in a core of the rotor.

3. The rotating electric machine according to claim 1, wherein a protrusion air-gap length for the plurality of protrusions is different from a permanent magnet portion air-gap length for the plurality of permanent magnets.

4. The rotating electric machine according to claim 1, wherein a permanent magnet portion angle for the plurality of permanent magnets is different from a protrusion angle for the plurality of protrusions.

5. The rotating electric machine according to claim 1, wherein in the field pole formed in the plurality of protrusions by energization to the armature winding and the field winding and the plurality of permanent magnets, the number of pole pairs Pa and the number of pole pairs Pf satisfy Pf÷Pa=3.

6. The rotating electric machine according to claim 1, wherein
the rotor includes a protrusion rotor unit and a permanent magnet rotor unit, and
the protrusion rotor unit and the permanent magnet rotor unit are assembled side by side in an axial direction.

7. The rotating electric machine according to claim 1, wherein the plurality of permanent magnets forms a corner on a fillet.

8. The rotating electric machine according to claim 1, wherein the plurality of protrusions have an arc shape.

9. The rotating electric machine according to claim 1, wherein a curvature of a curve where the plurality of protrusions and an air gap are in contact with each other is different from an outermost peripheral outer diameter of the rotor.

10. The rotating electric machine according to claim 1, wherein a tip portion of each of the plurality of protrusions is formed of an arc having a different curvature than on a fillet thereof.

\* \* \* \* \*